United States Patent Office 3,503,961
Patented Mar. 31, 1970

3,503,961
PROCESS FOR THE MANUFACTURE OF 17α,20;20,
21-BISMETHYLENEDIOXY-STEROIDS
Charles Meystre, Reinach, Basel-Land, Switzerland, assignor to Ciba Corporation, Summit, N.J., a corporation of Delaware
No Drawing. Filed Aug. 13, 1968, Ser. No. 752,163
Claims priority, application Switzerland, Sept. 4, 1967, 12,330/67
Int. Cl. C07c 167/00
U.S. Cl. 260—239.55       12 Claims

ABSTRACT OF THE DISCLOSURE

The new process consists in reacting a 17α,21-dihydroxy-20-keto-steroid with formaldehyde or a formaldehyde polymer and anhydrous hydrogen fluoride preferably in the presence of an aprotic solvent, such as dimethylformamide or dimethylsulfoxide. Any fluoromethoxy group formed in the compounds obtained is then selectively hydrolyzed to the free hydroxy group by means of an acid.

BACKGROUND OF THE INVENTION

It is known that in steroids containing the 17α-21-dihydroxy-20-keto grouping which, as is known, is very reactive, this grouping must be protected when on other parts of the steroid skeleton reactions are to be carried out that may also affect the 17α,21-dihydroxy-20-keto grouping. Nowadays, this is achieved by the reaction with aqueous formaldehyde in the presence of hydrochloric acid, whereupon the 17α,20;20,21-bis-methylenedioxy-steroids are obtained. However, even in the most favorable cases this reaction gives yields of only about 60%. Depending on the other substituents present in the steroid molecule the yield drops very substantially.

SUMMARY OF THE INVENTION

The present invention provides a method that enables the 17α,20;20,21 - bis - methylenedioxy-grouping to be formed in general with a high yield and under extremely mild conditions. According to this new method steroids containing a 17α,21-dihydroxy-20-keto grouping are reacted with formaldehyde or a formaldehyde donor, such as a formaldehyde polymer, for example para-formaldehyde, hexamethylenetetramine or especially trioxane, and anhydrous hydrogen fluoride and, if during this reaction further free hydroxyl groups present in the parent steroids have been etherified, they are selectively hydrolyzed.

It is known that when anhydrous hydrogen fluoride acts upon formaldehyde or a formaldehyde polymer fluoromethanol is formed as an intermediate. It is therefore probable that the above-mentioned reaction proceeds via this intermediate not contemplated in the present case, especially so as when the starting steroid contains further hydroxyl groups it leads to the formation of fluoromethyl ethers that are easy to split again to the free hydroxyl groups in a selective manner, for example by reaction with acids, such as hydrochloric, sulfuric or p-toluenesulfonic acid, preferably in the presence of urea and/or of a buffer such as calcium carbonate.

The bis-methylenedioxy grouping is advantageously introduced at a low temperature, especially below 60° C., above all at —20 to +20° C., advantageously in the presence of an aprotic solvent such as dimethylformamide or dimethylsulfoxide, of an ether such as dioxane or tetrahydrofuran, of a ketone such as acetone, or in the first place in dichloromethane. In this connection it is worthy of mention that when two mols of hydrogen fluoride, one mole of trioxane and one mol of dichloromethane are mixed together, a homogenous solution is obtained which is particularly easy to handle.

Suitable starting materials are all steroids containing the 17α,21-dihydroxy-20-keto grouping; they may also contain further substituents such as halogen, for example fluorine or bromine atoms, free or ketalized oxo groups, epoxy groups, lower alkyl groups such as methyl, or free esterified or etherified hydroxyl groups, and/or they may contain double bonds.

The invention includes also any variant of the present process in which a compound obtained as intermediate, for example fluoromethanol, is used as starting material and the remaining steps are carried out or in which a starting material is formed in situ. The invention further includes the etherification of steroids containing a free, etherifiable hydroxyl group in addition to a possibly present 17α,21-dihydroxy-20-keto grouping, by way of the above-mentioned reaction, whereby, as indicated, the corresponding fluoromethoxy steroids are obtained which are important intermediates.

The following examples illustrate the process of this invention.

Example 1

(a) *Manufacturing the reagent.*—In a closable polyethylene bottle of 25 cc. capacity 1 g. of paraformaldehyde is covered with 5 ml. of an anhydrous solution of 1.3 parts by weight of hydrogen fluoride in 1 part by volume of dimethylformamide. The suspension is stirred magnetically for 2 hours at 20° C., the stirrer used being an iron rod covered with Teflon.

(b) *Reaction with the reagent.*—In a closable polyethylene bottle of 25 cc. capacity 1 g. of prednisone is covered with the suspension prepared sub (a). The whole is stirred for 2 hours at 20° C. with a Teflon magnetic stirrer and then stirred into an aqueous solution, cooled to 0° C., of 40 g. of crystalline sodium acetate which shortly before has been mixed with 40 g. of ice in an open polyethylene vessel. The suspension is repeatedly extracted in a separating funnel with ethyl acetate, and the ethyl acetate solution is washed successively with dilute hydrochloric acid, water, dilute potassium bicarbonate solution and water, dried, filtered and evaporated under vacuum. The residue (1.2 g.) no longer displays any hydroxyl bands in the infrared spectrum, but it shows the typical BMD band in the region of 9.20μ. Recrystallization of the residue from methanol furnishes the known crystalline 17α,20;20,21-bis-methylenedioxy - 3,11 - dioxo-$\Delta^{1,4}$-pregnadiene which, depending on the crystallization conditions employed, melts between about 204 and 222° C.

Example 2

1 gram of cortisone is reacted under the conditions of Example 1(b) for 3 hours at 20° C. with the reagent of Example 1(a). Working up as described in Example 1(b) furnishes an extraction residue of 1.17 g. which no longer displays any hydroxyl bands in the infrared spectrum but shows the typical BMD band in the region of 9.20μ. The product is dissolved in methylene chloride, the methylenechloride distilled off and the residue recrystallized from methanol to yield the known 17α,20;20,21-bis-methylene-dioxy-3,11-dioxo-$\Delta^4$-pregnene melting at 250 to 255° C.

Example 3

(a) *Manufacturing the reagent.*—In a closable polyethylene bottle of 500 cc. capacity 50 g. of trioxane are covered at 0° C. with 250 ml. of an anhydrous solution of 1.3 parts by weight of hydrogen fluoride in 1 part by volume of dimethylsulfoxide and the whole is stirred for 1 hour at 0° C. magnetically with an iron rod covered with Teflon.

(b) Reaction with the reagent.—In a polyethylene bottle of 500 cc. capacity 50 g. of hydrocortisone are covered at 0° C. with the solution obtained sub (a). The suspension is stirred with a Teflon magnetic stirrer for 10 minutes at 0° C., with a complete solution being obtained after a short time which is stirred into an aqueous solution, cooled to 0° C., of 2 kg. of crystalline sodium acetate in 3 liters of water which shortly before has been mixed in an open polyethylene vessel of 15 liters capacity with 2 kg. of ice. The suspension is repeatedly extracted with ice-cold methylene-chloride, the methylenechloride extracts are washed with ice-cold 2 N-potassium bicarbonate solution and water, dried and evaporated under vacuum at 40–50° C. In the infrared spectrum the resulting crude $17\alpha,20;20,21$-bis-methylenedioxy-11-O-fluoromethyl-$\Delta^4$-pregnene no longer shows a hydroxyl band between 2.75 and 3.0$\mu$, but normal $\Delta^4$-keto bands are found at 6.05 and 6.20$\mu$ respectively, a strong band at 8.65$\mu$ (fluoromethyl ether group) and the typical BMD band in the region of 9.20$\mu$. Recrystallization of the crude product from ethyl acetate furnishes pure 11-fluoromethyl ether melting at 192–194° C. with decomposition.

(c) Splitting the O-fluoromethoxy group.—A mixture of 15 g. of calcium carbonate, 100 g. of p-toluene-sulfonic acid, 50 g. of urea and 100 ml. of water is introduced into a flask of 1500 cc. capacity; the reagents dissolve slowly partially with slight frothing and heating up. Then 68 g. of the crude fluoromethyl ether obtained sub (b) are dissolved at 20° C. in a total of ½ liter of dimethylformamide and poured into the flask. The resulting solution is stirred for 15 hours at 40° C. internal temperature, then diluted with ½ liter of methylenechloride, the insoluble urea derivatives are suctioned off through Hyflo and washed alternately with ½ liter each of water and methylenechloride. The resulting filtrate is diluted with 3 liters of ether and the solution is washed in a separating funnel 3 times with 1 liter of 2 N-hydrochloric acid, 3 times with water, twice with ½ liter of 2 N-potassium bicarbonate solution and 3 times with water. The washings are then individually agitated with 2 x 2 liters of a 3:1-mixture of ether and methylenechloride. The ether+methylenechloride extracts are dried with sodium sulfate, concentrated and finally evaporated under vacuum. The infrared spectrum of the resulting crude $17\alpha,20;20,21$-bis-methylenedioxy-3-oxo-11-hydroxy-$\Delta^4$-pregnene contains a sharp hydroxyl band at 2.85$\mu$ and no longer a distinct band at 8.65$\mu$. The crude product is dissolved in methylenechloride, the solution is mixed with ethyl acetate and the methylenechloride is evaporated. From the cooled ethyl acetate solution pure $17\alpha,20;20,21$-bis-methylenedioxy-3-oxo-11-hydroxy-$\Delta^4$-pregnene crystallizes out; it melts partially between 218–220° C., and then solidifies again to form prisms melting up to 235° C. The evaporated mother liquors are chromatographed on 300 g. of basic alumina (activity II). The evaporated first toluene fractions leave oily products behind. The further toluene and toluene+ether (99:1) fractions leave evaporation residues which on recrystallization from ethyl acetate furnish some more $17\alpha,20;20,21$-bis-methylenedioxy-3-oxo-11-hydroxy-$\Delta^4$-pregnene.

Example 4

(a) Manufacturing the reagent.—In a closable polyethylene bottle of 500 cc. capacity 50 g. of trioxane are dissolved in 200 ml. of methylene chloride. While stirring the solution with a Teflon-covered magnetic stirrer at 0° C. a current of hydrogen fluoride is passed through until a weight increment of 22 g. is found. If too much hydrogen fluoride has been added (which is recognizable by the solution turning turbid), the corresponding quantity of trioxane is added, whereupon the solution becomes clear again.

(b) Reaction with the reagent.—In a closable polyethylene bottle of 500 cc. capacity 50 g. of hydrocortisone are mixed at 0° C. with the solution obtained sub (a). The suspension is stirred for 20 minutes at 0° C. with a Teflon-covered magnetic stirrer, whereupon a clear solution is soon obtained and is stirred into a solution, cooled to 0° C., of 200 g. of crystalline sodium acetate in 300 ml. of water which at the last moment has been mixed in a polyethylene bucket of 2 liters capacity with 200 g. of ice. The resulting suspension is transferred to a 2 liter-separating funnel and extracted 6 times with about 200 ml. of methylenechloride on each occasion. The cold methylenechloride extracts are washed in 4 further 1 liter separating funnels successively, once with 300 ml. of cold 2 N-potassium bicarbonate solution and 3 times with 300 ml. of sodium sulfate solution of about 5% strength on each occasion. The combined extracts are dried with sodium sulfate, evaporated under vacuum at 40–50° C. and finely dried under a high vacuum until their weight remains constant. The residue—which gives an infrared spectrum identical with that of the crude product obtained in Example 3(b)—furnishes after splitting of the O-fluoromethyl group according to Example 3(c), $17\alpha,20;20,21$-bis-methylenedioxy-3-oxo-11-hydroxy-$\Delta^4$-pregnene which is identical with the product obtained in Example 3.

Example 5

(a) Reaction with the reagent.—50 grams of prednisolone are reacted with the reagent of Example 3(a) and worked up as described in Example 3(b). The infrared spectrum of the resulting crude 11-O-fluoromethylate (67 g.) contains no hydroxyl bands between 2.75$\mu$ and 3$\mu$ but the normal $\Delta^{1,4}$-3-keto bands in the 6$\mu$ region, a strong band at 8.65$\mu$ (fluoromethyl ether group) and the typical BMD band in the region of 9.20$\mu$. Pure $17\alpha,20;20,21$-bis-methylenedioxy-11-fluoromethoxy-3-oxo-$\Delta^{1,4}$-pregnadiene melts at 217 to 220° C. with decomposition, after recrystallization from methanol.

(b) Spitting the O-fluoromethoxy group.—67 grams of the crude 11-fluoromethyl ether obtained in Example 5(a) are reacted and worked up as described in Example (c). The infrared spectrum of the crude product contains a sharp hydroxyl band at 2.85$\mu$ but no longer a distinct band at 8.65$\mu$. The crude product is dissolved in methylenechloride, the solution is mixed with methanol and the methylenechloride is evaporated. On cooling, pure $17\alpha,20;20,21$-bis-methylenedioxy-3-oxo-11-hydroxy-$\Delta^{1,4}$-pregnadiene, melting at 267–279° C., crystallizes out. When the concentrated ethyl acetate mother liquors are left to themselves for some time, further small amounts of this product, which are however less pure, gradually crystallize out.

Example 6

A cold solution, saturated with hydrogen fluoride, of 800 mg. of trioxane in 5 ml. of methylenechloride is added to 500 mg. of flumethasone in a closable polyethylene bottle. The solution is stirred for 30 minutes at 20° C. with a Teflon-covered magnetic stirrer, and then poured into a cold solution of 5 g. of crystalline sodium acetate in 20 ml. of water which shortly before has been mixed with some ice in a polyethylene vessel. The resulting mixture is extracted with methylenechloride, and the methylenechloride solution is washed with a 2 N-potassium bicarbonate solution and then with water, dried and evaporated under vacuum at 40–50° C. in a rotary evaporator. The resulting crude fluoromethyl ether is mixed with 150 mg. of calcium carbonate, 1 g. of p-toluenesulfonic acid, 500 mg. of urea, 1 ml. of water and 5 ml. of dimethylformamide; the suspension is stirred for 20 hours at 40° C., then diluted with acetone, the insoluble urea derivatives are suctioned off, washed with acetone and the acetone is evaporated under vacuum. The residue is extracted with methylenechloride, the extract washed with dilute potassium bicarbonate solution and water, dried, and evaporated under vacuum, to leave as residue crude $17\alpha,20;20,21$-bis-methylenedioxy-3-oxo-$6\alpha,9$-difluoro-11-hydroxy-$16\alpha$-methyl-$\Delta^{1,4}$-pregnadiene. The infrared spectrum of a hot solution of the product in methylenechloride contains a hydroxyl band at 2.85μ (no ketone band at 5.90μ), the characteristic bands of the Δ$^{1,4}$-3-ketone between 6μ and 6.25μ and of the BMD grouping between 9.10 and 9.20μ. The crude product is dissolved in methylenechloride and filtered through 10 g. of alumina (activity II), the solution evaporated and the residue recrystallized from acetone+ether, to furnish pure 17α,20;20,21-bis-methylene-dioxy - 3 - oxo-6α,9-difluoro-11-hydroxy-16α-methyl-Δ$^{1,4}$-pregnadiene melting at 303–307° C. with decomposition. The mother liquors furnish some more of the same compound, but the product thus obtained melts somewhat lower, namely at 265–275° C. with decomposition.

Example 7

A cold solution, saturated with hydrogen fluoride, of 12 g. of trioxane in 50 ml. of methylene chloride is added to 10 g. of 3,20-dioxo-11β,17α,21-trihydroxy-16α-methyl-6α-fluoro-Δ$^4$-pregnene. The solution is stirred for 1½ hours at 0° C. with a Teflon-covered magnetic stirrer, and then poured into a cold solution of 80 g. of sodium acetate in 300 ml. of water which shortly before has been mixed with some ice in a polyethylene vessel. The resulting mixture is extracted with methylene chloride, the methylene chloride solution is washed successively with 2 N potassium bicarbonate solution and water, dried and evaporated under vacuum at 40–50° C. in a rotary evaporator. The resulting crude fluoromethyl ether (about 15 g.) is mixed with 3 g. of calcium carbonate, 20 g. of para-toluene-sulfonic acid, 15 g. of urea, 30 ml. of water and 150 ml. of dimethyl-formamide; the suspension is stirred for 20 hours at 45° C., diluted with acetone, the insoluble urea derivatives are suctioned off, washed with acetone and the acetone is evaporated under vacuum. The residue is extracted with methylene chloride, the methylene chloride solution washed with dilute potassium bicarbonate solution and water, dried and evaporated under vacuum, to leave as residue crude 17α,20;20,21-bis-methylenedioxy - 3 - oxo-6α-fluoro-11β-hydroxy-16α-methyl - Δ$^4$ - pregnene. On recrystallization from ethyl acetate there are obtained 8.2 g. of the pure compound melting at 257–262° C. (with decomposition). The mother liquors are evaporated under vacuum. The residue dissolved in methylene chloride is filtered over 30 g. of alumina (activity II) and all the eluates are evaporated under vacuum. From the residue there can be obtained with ethyl acetate another 870 mg. of the above 17α,20;20,21-bis-methylenedioxy derivative compound having a somewhat lower melting point (245–258° C. with decomposition).

I claim:
1. Process for the manufacture of 17α,20;20,21-bis-methylenedioxy-steroids, wherein a steroid containing a 17α,21-dihydroxy-20-keto-grouping is reacted with anhydrous hydrogen fluoride and a member selected from the group consisting of formaldehyde and a formaldehyde donor, and any etherified hydroxy group obtained during this reaction from further free hydroxyl groups present in the parent steroids is selectively hydrolyzed.

2. Process as claimed in claim 1, wherein para-formaldehyde is used as formaldehyde donor.

3. Process as claimed in claim 1, wherein the reaction is carried out in the presence of an aprotic solvent.

4. Process as claimed in claim 1, wherein the reaction is carried out in the presence of an aprotic solvent selected from the group consisting of dimethylformamide and dimethylsulfoxide.

5. Process as claimed in claim 1, wherein the reaction is carried out in the presence of dichloromethane.

6. Process as claimed in claim 1, wherein a solution obtained by mixing together two mols of hydrogen fluoride, one mol of trioxane and one mol of dichloromethane is used.

7. Process as claimed in claim 1, wherein the bis-methylenedioxy grouping is introduced at a temperature below 60° C.

8. Process as claimed in claim 6, wherein the bis-methylenedioxy grouping is introduced at a temperature below 60° C.

9. Process as claimed in claim 8, wherein the bis-methylenedioxy grouping is introduced at a temperature of −20 to 20° C.

10. Process as claimed in claim 1, wherein fluoromethylethers obtained are hydrolyzed selectively by treatment with acids.

11. Process as claimed in claim 10, wherein hydrolysis is performed with p-toluenesulfonic acid in the presence of urea.

12. Process as claimed in claim 10, wherein hydrolysis is performed with p-toluenesulfonic acid in the presence of a buffer.

References Cited

UNITED STATES PATENTS 3,116,287   12/1963   Hirschmann et al. __ 260—239.5

ELBERT L. ROBERTS, Primary Examiner